US005782270A

United States Patent [19]

Goett et al.

[11] Patent Number: 5,782,270

[45] Date of Patent: Jul. 21, 1998

[54] FIELD REPAIRABLE CONDUIT TERMINATION SYSTEM

[75] Inventors: Edward P. Goett, Geyserville; Roger Woehl, Rohnert Park, both of Calif.

[73] Assignee: Engineered Transistions, Inc., Healdsburg, Calif.

[21] Appl. No.: 767,570

[22] Filed: Dec. 16, 1996

Related U.S. Application Data

[63] Continuation of Ser. No. 439,659, May 12, 1995, abandoned.

[51] Int. Cl.[6] .......... F16L 11/11

[52] U.S. Cl. .......... 138/109; 138/121; 138/123; 285/149

[58] Field of Search .......... 138/109, 96 T, 138/123, 120, 121; 285/2, 80, 89, 92, 109, 149

[56] References Cited

U.S. PATENT DOCUMENTS

| | | | |
|---|---|---|---|
| 2,858,147 | 10/1958 | Guarnaschelli | 285/149 |
| 2,907,590 | 10/1959 | Oswald | 285/80 |
| 3,333,439 | 8/1967 | Bessette | 285/80 |
| 3,895,177 | 7/1975 | Muslin | 138/109 |
| 4,005,735 | 2/1977 | Miyamoto | 138/109 |
| 4,106,526 | 8/1978 | Szentmihaly | 138/109 |
| 4,142,554 | 3/1979 | Washkewicz et al. | 138/141 |
| 4,945,951 | 8/1990 | Beamer | 138/96 T |
| 5,349,988 | 9/1994 | Walsh et al. | 138/109 |
| 5,406,983 | 4/1995 | Chambers et al. | 138/109 |

*Primary Examiner*—David Scherbel
*Assistant Examiner*—James F. Hook
*Attorney, Agent, or Firm*—Howard L. Rose

[57] ABSTRACT

A cable termination system for heavy duty cables having a threaded metallic or plastic shield includes only two members; a termination body and a termination nut, the former having internal threads mating with an internal thread shield of the cable and the latter having rounded internal threads mating with rounded external threads of the termination to clamp at least the outer braids of the cable between the external threads of the termination and the internal threads of the termination nut. The termination body is screwed onto the shield and provides an annular pocket to receive the end of the shield to protect the wires of the cable from burrs and sharp edges at the end of the shield. The internal threads of the termination have a different pitch from those of its external threads whereby the threads bind the termination nut and prevent it from becoming unscrewed from the cable. The termination nut is locked in place by snap rings and its end seats against an O-ring to isolate it from the environment while the other end of the nut engages a projection on the termination body to seat the outer covering of the cable between the two elements of the system.

14 Claims, 3 Drawing Sheets

FIELD REPAIRABLE CONDUIT TERMINATION SYSTEM

This is a continuation application Ser. No. 08/439,659, filed on May 12, 1995 now abandoned.

FIELD OF THE INVENTION

The present invention relates to a system for terminating heavy duty shielded metal and plastic conduits to end fitting hardware, and most particularly to the use of a mating termination body and nut to provide a means for securing an inner core, a braided shield and a protective rubber jacketing of a conduit to an end fitting in a manner that will meet the physical requirements of the operating environment and allow for easy installation and repair.

BACKGROUND OF THE INVENTION

Various means for terminating heavy duty shielded metal and/or plastic conduits referred to throughout this application as heavy duty conduits to end fitting hardware currently exist. One common method is to braze or solder the metal conduit to a metal end fitting, and to use some clamping means to secure the rubber jacket to the adapter. This method cannot be easily repaired, and requires the use of a torch which prevents repair and installation in areas where volatile materials are present. Careless installation of a soldered system can create a sharp burr or edge which can damage wires.

A second common means to terminate heavy duty conduits to end fittings is to use a system of multiple circular wedges and clamps to individually secure the metal core, heavy braided shielding, and rubber jacketing to an adapter body. These systems having a long overall length which increases conduit fallibility in tight places. While these systems can be field repairable their 5 to 7 separate components make them cumbersome to use in the field.

Another method that has been used to terminate lightweight shields to adapter bodies has incorporated a rounded "light bulb" thread that clamps a braided metal shield between the threads of mated body and nut. This type of system has not been used with heavy duty conduits because vibration forces can cause the nut to loosen in service. In addition, high friction is created when installing a nut over heavy duty braid which can scrape the protective plating off the nut, and result in galvanic corrosion between the braid and the base metal of the nut. "Light bulb" type terminations are subject to failure from twisting which causes the conduit to unscrew itself out from under the nut. A common preventative measure is to over tighten the nut which can result in damage to the braided shield. Traditional light bulb systems have had to address environmental sealing requirements by adding additional components to the termination system, thereby adding to the complexity.

None of the prior art pertaining to heavy duty conduit termination systems has included a simple two piece termination that addresses vibration and environmental sealing in a system that is both easy to install and repair.

Heavy duty conduits that may include an inner metal or plastic core, multiple layers of metal or plastic shield and an outer elastomeric jacket require some method of attachment to end fittings. Such conduits are commonly used in naval and land vessels and aircraft to provide both environmental and electromagnetic protection for wiring systems. These systems often require repairs necessitating the removal and replacement of the end fittings. The repairs often occur in locations where access is limited by space and the operating environment, examples of which include the engine room or mast heads of sea going vessels. There is an industry need for a system that meets the physical requirements of difficult operating environments and yet is easily field repairable, containing no more than one component separate from the end fitting body.

OBJECTS OF THE INVENTION

It is an object of the present invention to provide a physically durable termination system for heavy duty conduits that is both quick and easy to repair and utilizes only one component in addition to an end fitting body.

It is another object of the present invention to provide a termination system that provides an environmental seal and is resistant to corrosion.

It is yet another object of the present invention to provide a termination system resistant to heavy vibration.

It is an object of the present invention to provide a termination system with only two separate components.

It is another object of the present invention to provide a termination system with a low ground path resistance between the conduit shield and the mating end fitting.

It is another object of the present invention to provide a termination system which does not require any heat or flame to repair, or install.

It is an object of the present invention to provide a termination system that prevents any sharp burr or edge of the conduit from damaging internal wires.

It is yet another object of the current invention to provide a termination system that will not scrape the plating off of the components during installation.

It is another object of the present invention to provide a termination system that can be reused after a repair to the conduit.

It is an object of the present invention to provide a termination system that will prevent the conduit from twisting out of the termination.

It is an object of the present invention to provide a termination system that will automatically position the braided shield for correct alignment with a termination nut.

Yet another object of the present invention is to provide a termination system with a short length.

BRIEF DESCRIPTION OF THE INVENTION

The present invention provides a backshell termination system for heavy duty shielded conduits that enable the conduit to be attached to end fittings such as electrical backshell adapters or bulkhead fittings. These heavy duty shielded conduits typically consist of a metal or plastic core constructed of a helical or annular wound metal strip, or extruded plastic tube, one or more layers of a heavy gage braided metal or plastic shield and an outer jacket of an elastomeric material such as neoprene rubber, or heat shrink plastic tubing.

A circular end fitting employing the termination system of this invention is comprised of an interface at the front end as required by the application of the conduit, and the repairable conduit termination system at the back end. The termination system is comprised of two main components, a termination body, and a termination nut. The circular body of the termination body contains internal threads suitable for mating with the outside profile of the helical or annular core of the conduit. When installed the termination body is threaded over the helical or annular inner core and under the layers of braided shield. The external surface of the termination body has rounded threads suitable for mating with rounded threads internal to the termination nut. The termination nut is installed by threading forward over an exposed section of braid such that the braid is forced down into the external threads of the extermination body, thereby sandwiching the braid between the body and the nut. A radial inwardly protruding lip on the rear end of the termination nut cooperates with a radial axially extending lip on the rear of the termination body to capture the rubber jacket of the conduit and form a moisture tight seal with the rear end of the nut. An O-ring on the front end of the termination body seats against the termination nut to form a moisture tight seal with the front of the nut.

The mated rounded threads of the termination body and the nut securely clamp the braided shield to provide both tensile holding force, and to electrically ground the braided shield to the end fitting, with minimum damage to the braid.

An important feature of the termination system is a locking mechanism which captures the nut and prevents its removal without considerably more torque required to remove it than was required to install it. The locking mechanism is comprised of one or more circular spring rings housed in the termination body which engage with a ramped lip on the front edge of the termination nut.

A unique feature of the termination system is the locking dual threads which prevent the conduit from twisting out of the termination. The pitches of the internal and external threads on the termination body differ sufficiently so that any attempt to twist the conduit out of the termination causes the threads to bind, thereby locking the conduit from rotation. The conduit can only be removed by first removing the termination nut. This feature can be enhanced by using a left hand rounded thread on the termination body and nut.

An axially extending lip internal to the termination body encases the sharp edge of the conduit inner core to protect wires in the conduit from nicks or cuts. The position of the lip relative to the rear end of the termination positions the conduit during installation for precise alignment of the braided shield with the rounded threads of the termination body. This assures that no strands of the braided shield will be pushed forward to interfere with the O-ring seal or the locking mechanism.

DETAILED DESCRIPTION OF THE PRESENT INVENTION

Figure 1:
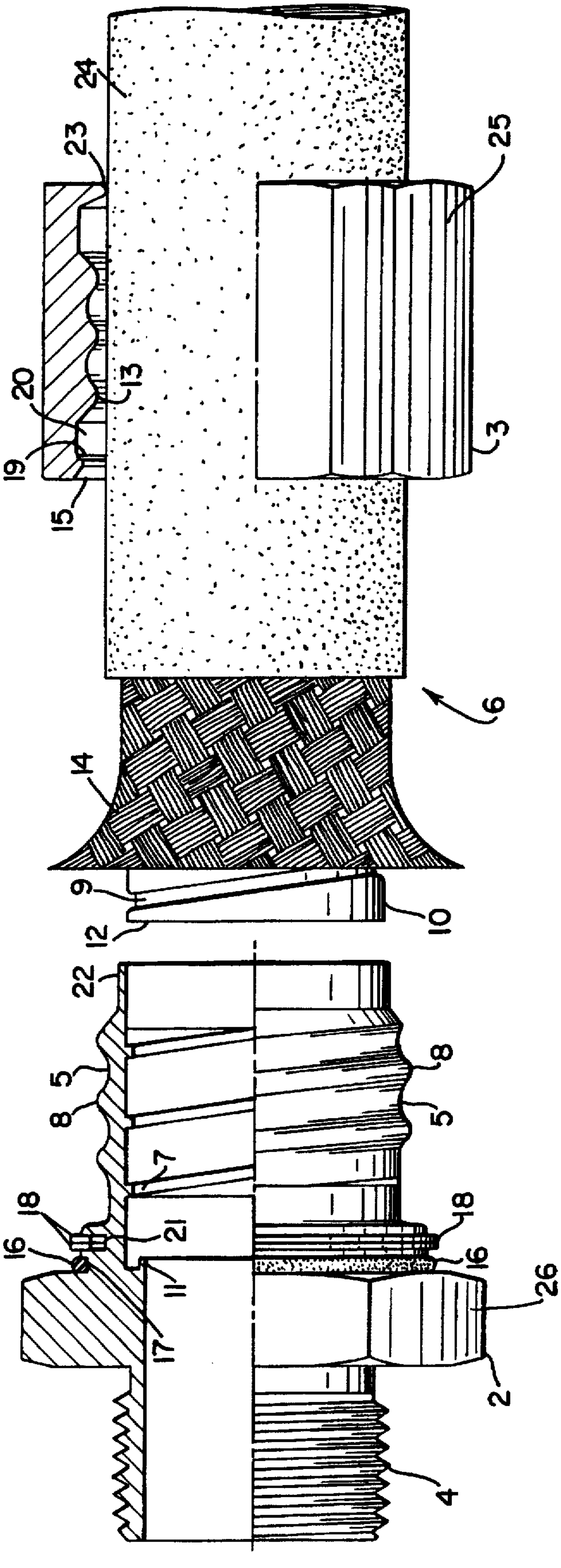
FIG. 1 is an illustration of the termination system prior to installation on a conduit with five parts shown in cross section to reveal the internal threads of the termination body and nut.
Figure 3:
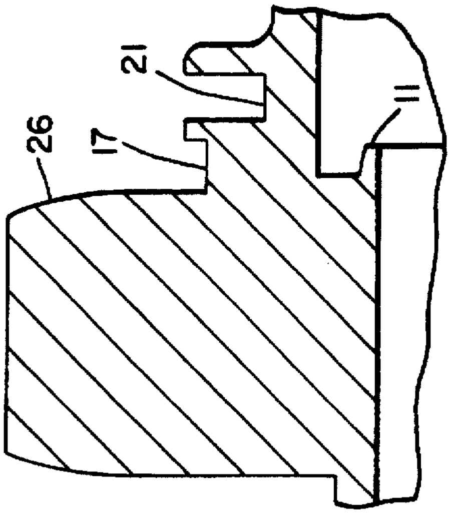
FIG. 3 is a detailed cross sectional view of the area of the termination that mates with the cable shield.
Figure 2:
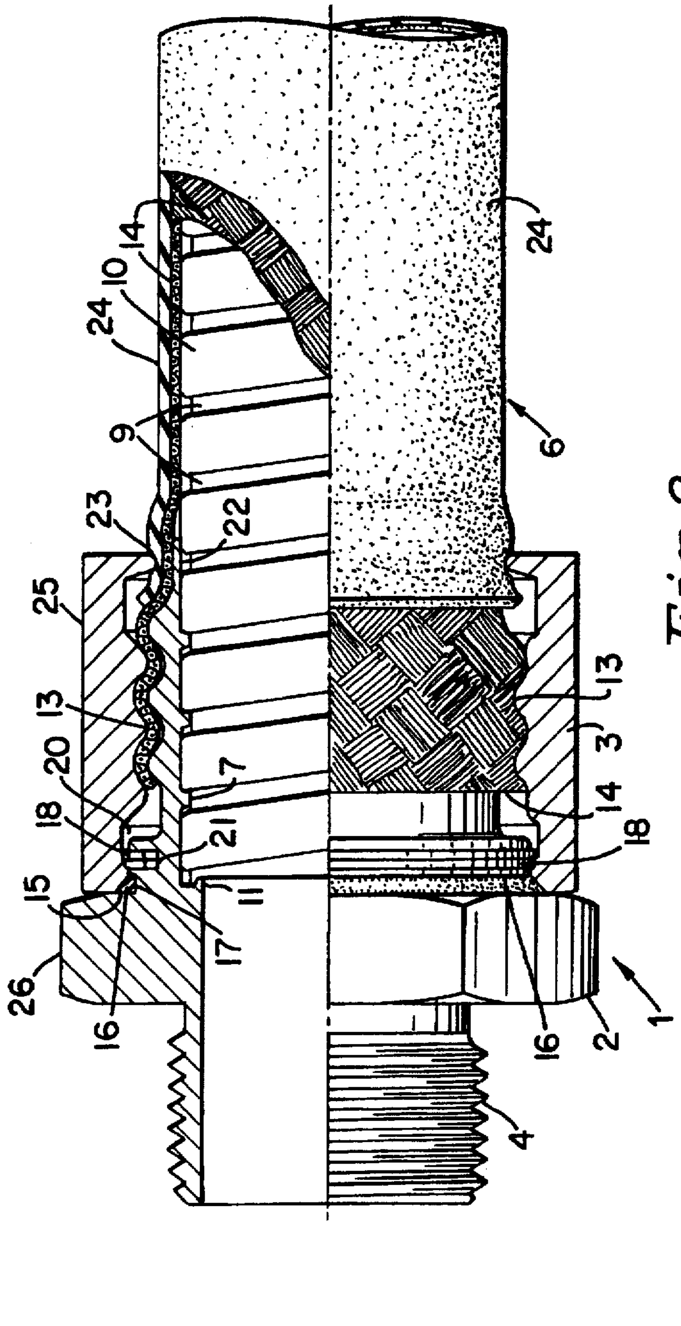
FIG. 2 illustrates the assembled termination system partially in section.

Referring now to FIGS. 1 and 2 of the accompanying drawings, a conduit end fitting 2 is shown prior to, and following installation on a conduit 6. The end fitting 2 is a hollow cylindrical body having a connection interface 4 at a front end and a conduit termination 5 at the back end. The termination 5 has both internal threads 7 and rounded external threads 8. The internal threads 7 are suitable for mating with a helical groove 9 formed externally on inner core 10 of the conduit 6. A short annular lip 11 internal of the termination 5 (see FIG. 3) extends axially to the right as viewed in FIGS. 2 and 3 for receiving in the groove between the lip 11 and main body of the termination, a forward edge 12 of the conduit inner core 10. Thus internal wires are protected from the sharp edges of the core. The rounded external threads 8 of the termination 5 cooperate with rounded internal threads 13 of termination nut 3 to securely capture and clamp braided shield 14 of the metal conduit 6. The nut 3 is disposed about an outer jacket 24 of the conduit 6 and can be slid along the jacket to slide over the shield 14 and outer jacket 24 and engage threads 8 of the termination. The outer jacket may be of a different suitable material from rubber.

Figure 4:
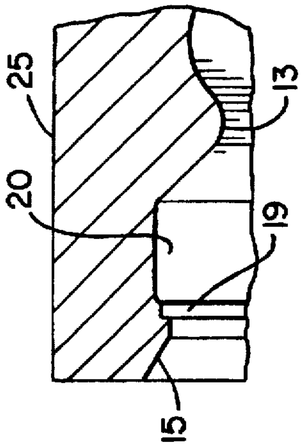
FIG. 4 is a cross sectional view of the latching area of the nut that mates with the termination.

When fully installed a ramped surface 15 at the left end of the nut 3 as seen in FIG. 4, seats against an O-ring 16 housed in a groove 17 (see FIG. 3) in the termination body 2 to form a moisture seal. During installation the ramped surface 15 serves to drive spring rings 18 located in groove 21 (see FIG. 3) radially inward to allow a stepped shoulder 19 (see FIG. 4) to pass over the spring rings. Once the shoulder 19 passes over the spring rings 18 they expand outwardly into a pocket 20. The stepped face of shoulder 19 which is steeper than the ramp 15 engages with spring rings 18 to prevent nut 3 from backing off until such time as a sufficiently large torque is applied to drive the spring rings 18 radially inward.

An axially extending surface 22 on the termination body 5 cooperates with an inwardly directed radial lip 23 on the nut 3 to compress the braided shield 14 and rubber jacket 24. Under compression the rubber jacket 24 forms a moisture seal with radial lip 23 of the termination nut 3.

A hexed or knurled surface 25 on the exterior of the nut 3, and a hexed or knurled surface 26 on the termination body 5 facilitate the use of tools for assembly or repair.

Figure 5:
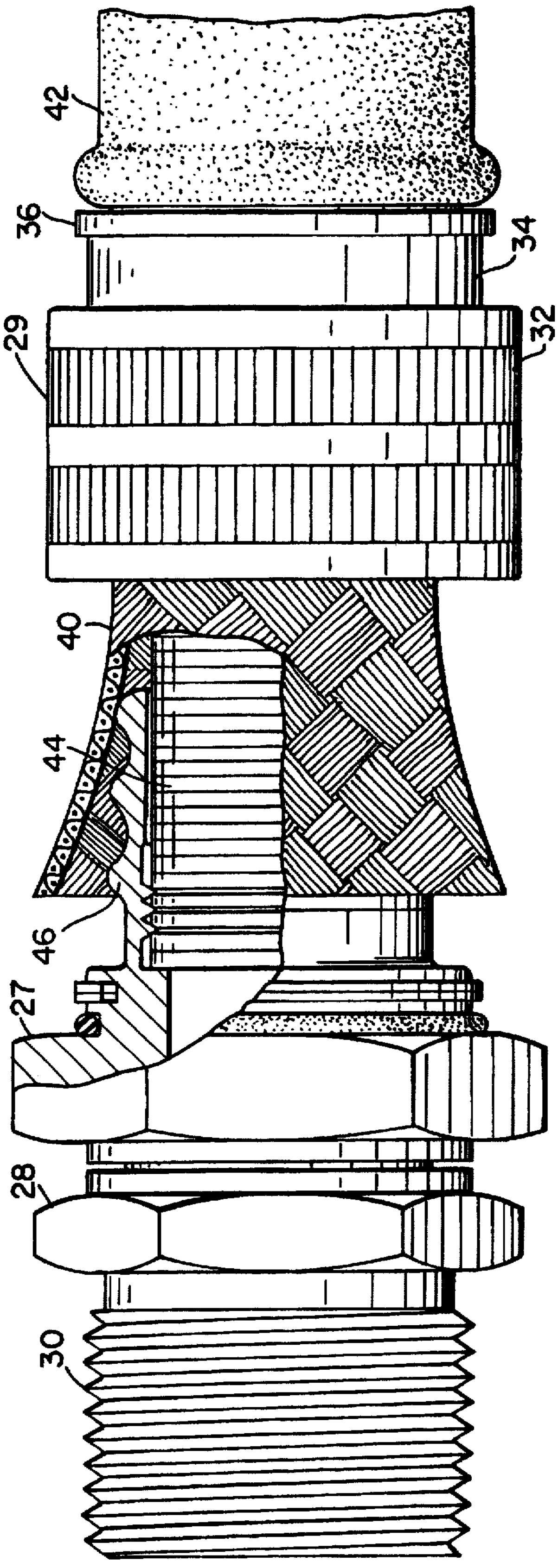
FIG. 5 is a partial view in cross section of a second embodiment of the present invention.

Referring now specifically to FIG. 5 of the accompanying drawings there is illustrated a second embodiment of the present invention. As discussed below there are two noticeable differences between the first embodiment of the invention and this embodiment. Specifically, the fixed front end (left end of FIGS. 1 and 2) of the end fitting termination is replaced by coupling hex nut 28 freely rotatable on the termination 29. The hex nut 27 is employed in place of the knurled region on the prior embodiment to screw the termination onto the cable. The nut 28 rotates threaded region 30 on the front of the termination 29 to couple the termination (backshell) to an electrical connector.

A further difference is in the structure and method for securing outer sleeve 38 of the cable 31 to nut 32. Specifically, the nut 32 has a rearward axially extending annular skirt 34 terminating at its back end in a radially extending annulus or lip 36.

Figure 7:
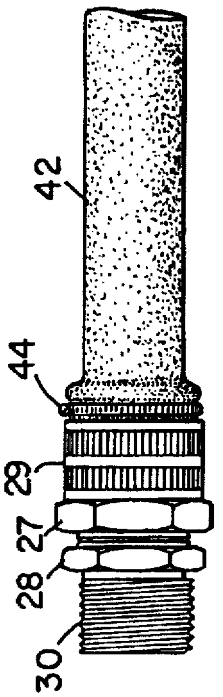
FIG. 7 is the completed termination of the embodiment of FIG. 5.
Figure 6:
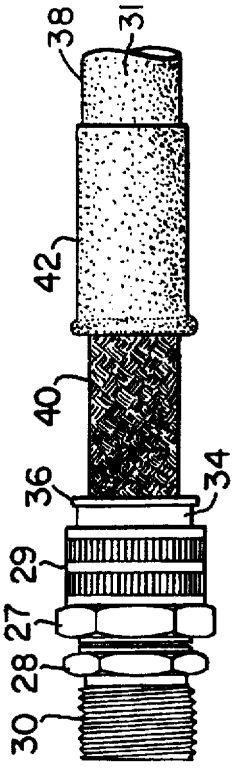
FIG. 6 is a view partially in section of the interior of the embodiment of FIG. 5.

In assembling the backshell, outer sleeve or covering 38 of cable 31 is peeled back over the cable, region 42. Braid 40 of the cable 31 is clamped as in the first embodiment between the termination 29 and nut 32 (see FIG. 7). After the braid is clamped, the region 42 is pulled over the skirt 34, trimmed to size initially, if necessary, and then a clamp 44 (see FIG. 7) may be disposed over the outer covering where it is covering the skirt 34. The clamp is disposed to the left of the lip as viewed in FIG. 7.

It is noted from FIG. 5 that the internal threads of the termination 29 are sharp rather than square.

As previously indicated the pitch of the threads on the terminations and the nuts that cooperate with the terminations to clamp at least the braid are different so that the conduit cannot twist out of the termination 5. The snap rings insure that the nut 3 cannot back off. Thus with the nut locked and the use of the differential in threads even extreme vibration does not undo the assembly.

In both embodiments of the invention the coupling between the termination and the nut are sealed against the environment by O-rings and by clamping the outer covering of the cable but in different ways. Such sealing of the connections also greatly reduces the danger of corrosion. It is also noted that intimate contact is made between the termination and the corehelix of the cable via the teeth of the termination. Further, the braid is held tightly against the termination by the nuts with the rounded internal threads thus insuring a low ground path resistance.

The configuration of the mating surfaces of the termination, the cable core and the last-mentioned nut prevents damage from burrs or sharp edges. The cable core terminates interiorly of the member 11 against hard metal surfaces of the termination and the braid is clamped between gently rounded surfaces.

If it is desired to repair or replace the termination, the nut 3 is backed off and then the termination 5 is unscrewed from the cable. The cable is then free to be repaired.

It is readily apparent that the structure is not at all long and in fact is quite short, easily repaired, vibration resistant and environmentally sealed.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A two-part, field repairable backshell adapter for assembly with a conduit including a hollow inner core having a helical thread formed on its outer surface, a metal shield over the inner core and a sheath over the shield comprising a backshell adapter having a hollow conduit end fitting and a termination nut having internal threads, said conduit end fitting having at a first end including means for connecting the backshell adapter to another structure and having at a second end internal and external threads with an enlarged region separating said two ends, a hollow cylindrical lip extending axially from the enlarged region away from the first end, said hollow lip having an outer diameter such as to provide a snug fit within a core of a conduit when a conduit is disposed over said external threads and into contact with said enlarged region, said internal threads of the second end snuggly matable with the external threads of said core, said internal threads of said nut matable with said external threads of the second end of the conduit of the end fitting, said internal threads of said nut having a diameter to accept and snuggly capture a shield of a conduit between the two sets of threads.

2. An adapter according to claim 1 further comprising a first circumferential recess formed generally at the junction of said enlarged region and said second end of said conduit end fitting for receiving a sealing gasket, said nut having a ramp surface that contacts and compresses said gasket when said nut is fully engaged with the threads of the second end of said conduit end fitting.

3. An adapter according to claim 2 further comprising a second circumferential recess formed in said second end adjacent said first circumferential recess for receiving snap rings of a diameter to be compressed by said ramp, said ramp formed at the end of an inwardly directed circumferential shoulder at the end of the nut adjacent said enlarged region, said shoulder capturing the outer regions of the snap rings when the nut is in full engagement with the threads of said second end of said enlarged region and abutting said enlarged region.

4. An adapter according to claim 3 further comprising a hollow cylindrical flat end region extending from the end of said second end remote from said enlarged region, said nut having an inwardly directed circumferential shoulder dimensioned to clamp against a shield and sheath of a conduit to seal against water.

5. An adapter according to claim 1 wherein said first end includes means for permitting rotation of said enlarged region relative to the end of said first end remote from said enlarged region, said means for permitting rotation having a swivel disposed on said first end of said conduit end fitting to permit rotation of said enlarged region relative to the end of said first end remote from said enlarged region.

6. A field repairable backshell adapter for assembly with a conduit including a hollow inner core having a helical thread formed on its outer surface, a metal shield over the inner core and a waterproof sheath over the shield comprising a hollow cylindrical conduit end fitting and a termination nut having internal threads, said conduit end fitting having a first end region, a second end region and a circumferentially enlarged members lying between said end regions, said second end region having exterior rounded threads, said second end region having at least one means for preventing the braid of a conduit from rotating relative to said adapter upon connection of said adapter to a conduit, and nut means for pressing a shield of a conduit against said means for preventing.

7. An adapter according to claim 6 wherein said means for preventing comprises at least one axially extending groove in said threads of said second end region, said nut pressing a shield of a conduit into said groove upon threading said nut onto said second end region.

8. An adapter according to claim 7 wherein the intersection of said groove and the surface of the second end region provide sharp edges.

9. An adapter according to claim 6 wherein said means for preventing comprises a toothed circumferential ring located on said second end region.

10. An adapter according to claim 6 further comprising a hollow cylindrical lip extending axially from adjacent the enlarged member toward the second end region, said lip having an outer diameter such as to be snuggly received in a core of a conduit to which the adapter is to be assembled.

11. An adapter according to claim 6 further comprising said second end region having means for clamping an outer sheath of a conduit, said means for clamping having an outwardly extending circumferential flange located at the end of said second end means remote from said enlarged region.

12. An adapter according to claim 6 further comprising a first external circumferential groove formed generally at the junction of the enlarged member and the second end comprising means for accepting a sealing member, a second external circumferential groove formed in said second end means for receiving snap rings, an end of said nut that upon being fully screwed onto the conduit end fitting is dimensioned to contact said enlarged member, said nut having a ramp at its end adapted to pass over spring rings seated in said second groove and contact and compress a sealing member situated in said first groove, an external groove in said nut located behind said ramp for accepting said spring rings.

13. An adapter according to claim 6 further comprising an annular pocket formed in said enlarged member to snuggly receive a core of a conduit to be assembled on said adapter.

14. An adapter according to claim 6 wherein said second end region of said conduit end fitting has interior threads for mating with the threads on a core of a cable, said interior threads of said conduit end fitting and said threads of said termination nut have threads reversed relative to one another.

* * * * *